United States Patent [19]
Last et al.

[11] Patent Number: 5,824,910
[45] Date of Patent: Oct. 20, 1998

[54] MINIATURE HYDROSTAT FABRICATED USING MULTIPLE MICROELECTROMECHANICAL PROCESSES

[75] Inventors: Howard R. Last, Columbia, Md.; Lawrence C. Fan, Vienna, Va.; Ralph E. Balestrieri; Donald R. Garvick, both of Silver Spring, Md.; Robert L. Wood, 204 Barons Glenn, Cary, N.C. 27513

[73] Assignee: The United States of America as represented by the Secretary of the Navy, Washington, D.C.; by said Howard R. Last, Lawrence C. Fan, Ralph E. Balestrieri, Donald R. Garvick

[21] Appl. No.: 840,780

[22] Filed: Apr. 16, 1997

[51] Int. Cl.$^6$ ....................................................... G01L 7/08
[52] U.S. Cl. ................................................................ 73/715
[58] Field of Search .............................. 73/715, 716, 717, 73/718, 719, 720, 721, 723, 724, 725, 726, 727, 709, 778

[56] References Cited

U.S. PATENT DOCUMENTS 5,333,504  8/1994  Lutz et al. .................................. 73/727
5,536,963  7/1996  Polla ........................................... 73/720
5,559,358  9/1996  Burns et al. ................................ 73/778
5,583,296  12/1996  Mokwa et al. ............................ 73/718

Primary Examiner—William L. Oen
Attorney, Agent, or Firm—Kenneth W. Dobyns; William C. Townsend; Edward J. Connors, Jr.

[57] ABSTRACT

An improved hydrostat constructed on a silicon wafer by microfabrication methods similar to those used for integrated circuits and other devices. A thin section of the wafer acts as a diaphragm, responsive to pressure of ambient water. A lever arm is affixed at its first end to one point on the surface of the wafer and extends over the diaphragm, so arranged that the lever arm will be forced away from the wafer when pressure is applied to the diaphragm. The second end of the lever arm is moved by the diaphragm so that it moves further from the wafer, by a factor of the mechanical advantage of the lever. When the second end moves away from the wafer, it mechanically releases a lock, allowing an ordnance device to which the hydrostat is attached to arm.

7 Claims, 3 Drawing Sheets

PRESSURE

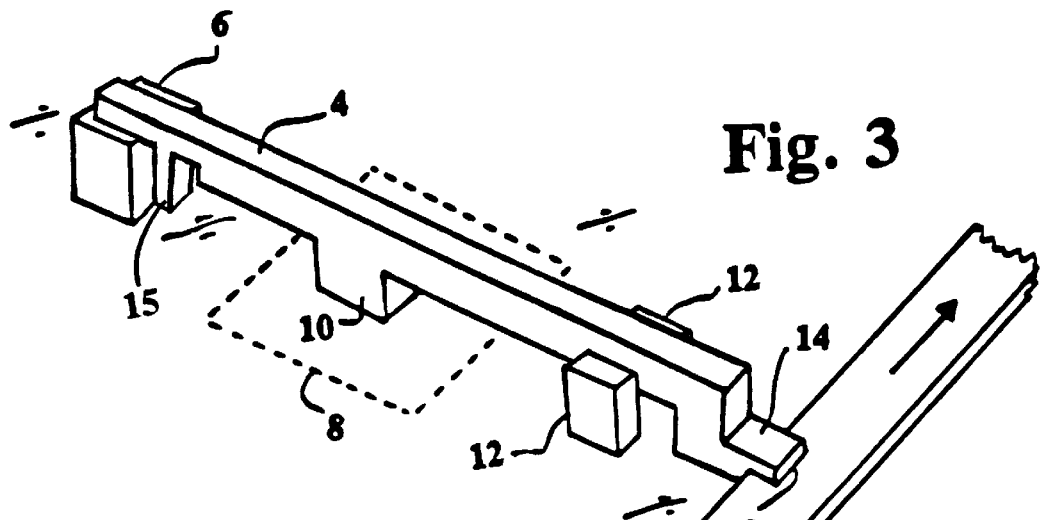
Fig. 3
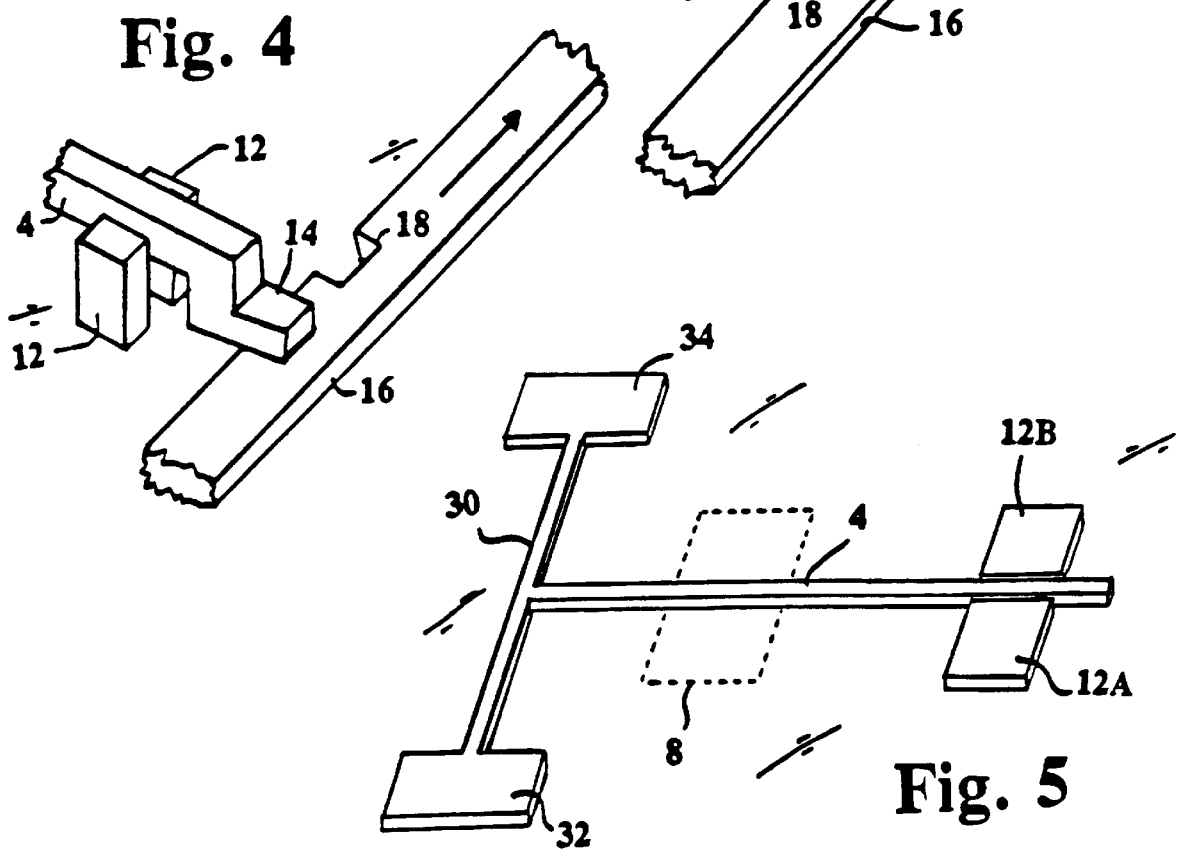
Fig. 4
Fig. 5

MINIATURE HYDROSTAT FABRICATED USING MULTIPLE MICROELECTROMECHANICAL PROCESSES

BACKGROUND OF THE INVENTION

1. Field of the Invention

Hydrostats are used extensively in many undersea weapon Safety and Arming (S&A) Devices. As opposed to a pressure switch that completes an electrical circuit, a hydrostat is a mechanical pressure sensor that converts pressure directly into mechanical motion. When pressure is sensed, the hydrostat will perform a mechanical function in the operation of the S&A. This mechanical function can be the unlocking of an S&A interrupter and/or performing electrical switching. The hydrostat of this invention provides the functionality of a traditional conventionally machined hydrostat on a miniature scale.

2. Description of the Prior Art

Hydrostats can function both as a pressure sensor and as a mechanical actuator, as hydrostats are currently used in underwater ordnance S&A devices. In this application the hydrostat provides a direct mechanical lock and positive safety control on an ordnance warhead arming cycle until a predetermined underwater depth is reached. Such hydrostats are generally one-of-a-kind designs specific to unique weapon requirements and operational scenarios. For this reason, these hydrostatic devices have little or no commercial market value.

Commercial hydrostatic pressure devices fall primarily into two categories: (1) Solid state pressure sensors that provide only an electrical signal output that varies over a given pressure range and (2) Pressure switches that provide a mechanical switching function in an electrical circuit (i.e. a microswitch) at specific design pressures.

Past and current Navy hydrostat designs use sealed evacuated metal bellows, silicone rubber diaphragms, metal diaphragms, and pistons to provide this S&A feature. In the past decade, however, the manufacturing technology to produce these hydrostatic devices has continued to decline rapidly, resulting in increased fabrication costs. Additionally, the once wide-spread expertise needed to reproduce current designs with metal bellows and diaphragm-type hydrostatic actuators has disappeared since the modern commercial market is focused only on pressure sensors and switches. The need for purely mechanical-type hydrostatic devices persists for underwater ordnance safety systems in order to provide a simple, straightforward and safe water-depth sensor and direct acting actuator which will exert direct environmental control in the warhead arming sequence.

In addition, the next generation of Navy underwater ordnance systems requires considerable miniaturization to produce weapons components that are comparable to microelectronic systems in size. Miniaturization of S&A components helps to maximize warhead payload capacity. Current hydrostat designs cannot be miniaturized to the required design requirements.

SUMMARY OF THE INVENTION

We have discovered a novel microminiature hydrostat created through a combination of electroplating and bulk microfabrication techniques. The microfabricated hydrostat has a diaphragm cut into a wafer such as a silicon semiconductor wafer, a displacement amplifying lever attached to the wafer and responsive to the displacement of that diaphragm under differing pressure conditions, various fixed supporting structures, and a mechanical release for triggering further action, such as enabling the arming of an ordnance device or enabling a slider to move.

Two hydrostat lever concepts exist using the combination of the two construction process techniques. An assembled lever concept uses discreet, fully released assembled components, and a partially released lever concept uses components that remain attached at some points to a silicon substrate.

BRIEF DESCRIPTION OF THE DRAWINGS

FIG. 3 is a perspective view of the hydrostat shown in FIGS. 1A and 1B, and showing its trigger in the non-actuated locking mode.

FIG. 4 is a perspective view of a portion of FIG. 3, showing the hydrostat trigger in the released, non-locking mode.

FIG. 5 is a perspective view of hydrostat using the partially released concept, as shown in FIGS. 2A, 2B and 2C.

DESCRIPTION OF THE PREFERRED EMBODIMENTS

Figure 1A:
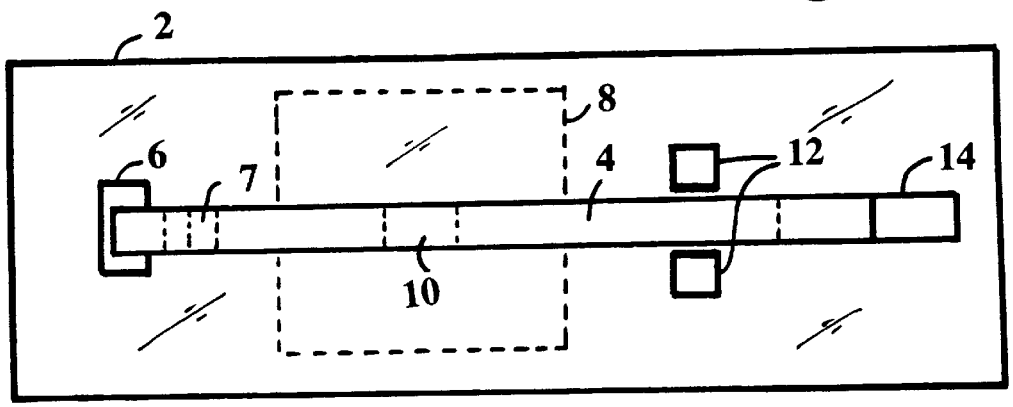
FIGS. 1A, 1B, and 1C are respectively a top view and two side views of a hydrostat using fully released assembled components according to the invention the wafer diaphragm and a pivoted attachment of a beam to the wafer. The side views 1B and 1C are cross-sectional views respectively showing the hydrostat not under pressure and under pressure.

The disclosed hydrostat embodiments can be constructed using micro-electro-mechanical machining processes which have their origins in the Integrated Circuit (IC) manufacturing technologies. As such, these technologies provide a technology with fabrication processes that will be viable for the foreseeable future and be far more economical than the fabrication processes used in previous hydrostat designs. The microfabrication technology is currently available from the MCNC MEMS Technology Applications Center, Research Triangle, N.C. 27709, and, at the time of this writing, is at least partially explained on their web home page (http://mems.mcnc.org/).

Broadly speaking, when the assembled lever concept is used, components are created by microfabrication on one wafer, and are then released from that wafer and used to complete a previously partly completed structure on another wafer. When the partially released lever concept is used, all components are created by microfabrication on a single wafer, then parts of some of those components are freed from connection to the wafer, while other parts of the components remain connected to the wafer.

For the electroplating process, the side of the wafer on which construction is to be done is first sputter-plated over with a titanium layer 300 Angstroms thick, then a copper layer 5000 Angstroms thick, then a second titanium layer 300 Angstroms thick. These layers act as a sacrificial metal which can easily and simultaneously be etched away to release any nickel or nickel alloy which might later overplate them. A photoresist layer of polymethylmethacrylate (PMMA) is laid down over the sacrificial layers and is milled to a desired thickness, typically 250 to 300 microns. PMMA is a photoresist when used in connection with x-rays. Photolithographic techniques are used to remove the photoresist in areas where a layer of nickel is desired. Then a layer of nickel or nickel-iron alloy (permalloy) is electroplated onto the exposed portions of the sacrificial metal. The surface is again milled to a thickness of 200 to 250 microns. The photoresist is then removed. The nickel parts can be released entirely or partly from the wafer by removing the sacrificial metal by exposure of the sacrificial metal to a release solution of ammonium hydroxide, hydrogen peroxide and water. Whether the nickel parts are released entirely or partly depends upon the time of exposure to the release solution and the distance from the nearest unprotected edge of the sacrificial metal layer. Large blocks of nickel take longer to release than thin strips of nickel, a fact which is useful in partially releasing a component.

Whether the partial release or the full release embodiment is to be used, the silicon wafer on which the final structure is to be located has a thickness of from 300 to 500 microns, preferably about 400 microns, before further processing. The wafer is then coated on one surface with a silicon nitride masking layer, and a window is opened on that surface for construction of a diaphragm area. The wafer is then immersed into an etch bath and the diaphragm is constructed in the area of the window. The diaphragm area is preferably rectangular and has rectangular side dimensions of about 1 to 5 millimeters, preferably about 2½ millimeters on each side. The thickness of the diaphragm is controlled by exposure time to the etching solution. The diaphragm has a thickness of 10 to 40 microns, preferably a thickness of 20 microns. When the hydrostat is in large-scale production, multiple diaphragm areas will be wet-etched into a single large wafer disc, which would later be cut into many individual sections, each containing a single hydrostat.

Figure 1B:
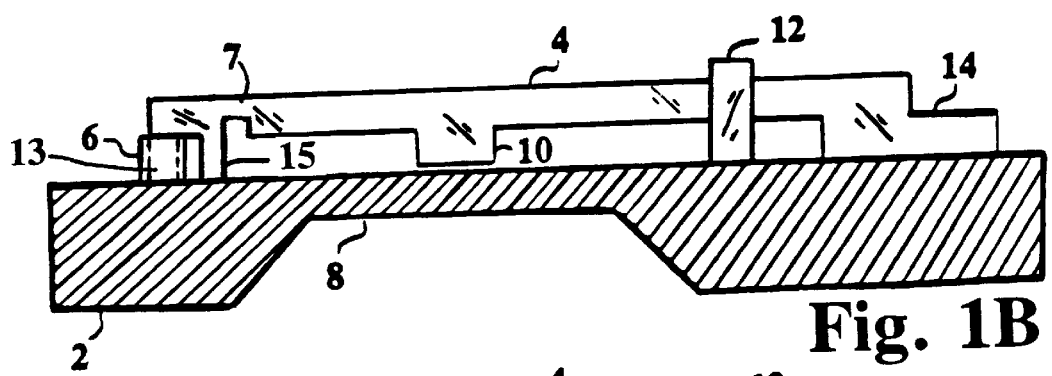
Figure 1C:
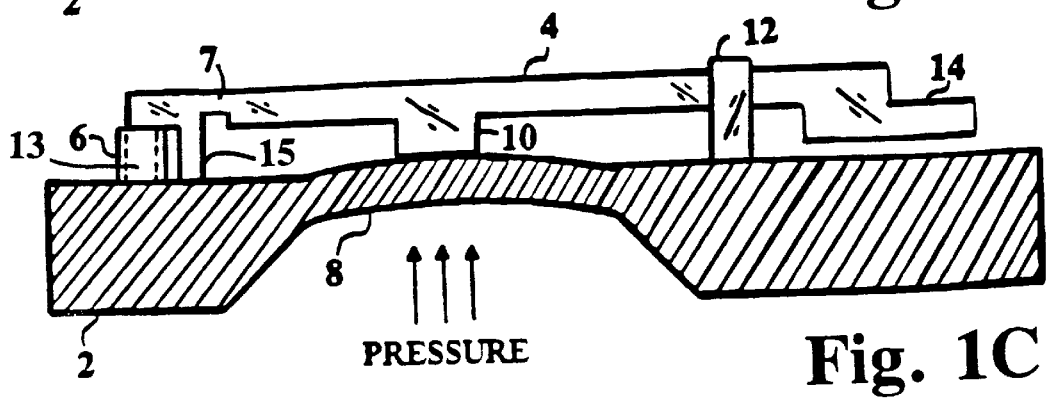

FIGS. 1A, 1B, 1C, 3 and 4 illustrate a hydrostat made in accordance with the assembled lever concept. FIG. 1A illustrates a hydrostat lever mounted on a silicon wafer 2, and FIGS. 1B and 1C illustrate this hydrostat in a side view, with the wafer shown in cross-section. In each of FIGS. 1A, 1B and 1C, a beam of lever arm 4 is attached to the wafer by an attachment point post 6, the post being fixedly attached to the wafer. In these FIGS. 1A, 1B, and 1C, the beam is fixedly attached to the post, with a thinner point 7 being provided on the beam which deforms in spring-fashion to serve as a hinge about which the beam can pivot up and down for rotational movement of the beam. The thinner point 7 is a schematic representation of many possible ways for providing a weaker section.

A pressure-responsive diaphragm is formed by a relatively thin section 8 of the wafer 2. A foot 10 extends downward from the beam in this embodiment to make contact with section 8 of the wafer within the diaphragm. When pressure is applied by the pressure in the ambient fluid in which the hydrostat is submerged, this pressure deflects the diaphragm toward the beam, and this foot causes upward rotational movement of the beam.

Guide posts 12, also fixedly attached to the wafer, prevent side-to-side movement of the beam caused by lateral forces. A second end 14 of the beam, which is at the opposite end of the beam from the attachment point post 6, rises and falls from the surface of the wafer with changes in pressure on the diaphragm. This mechanical movement of end 14 can serve as a trigger to mechanically unlock a safety on an ordnance device. The amount of movement of end 14 for a given amount of pressure is a function of the mechanical advantage of lever arm 4. The presently preferred embodiment uses a system which provides 4.5 units of movement of end 14 for 1 unit of movement of foot 10, or a movement ratio of 4.5:1. The beam has a length in the range of 5 to 25 millimeters, with a value of 10 millimeters in the presently preferred embodiment.

FIGS. 3 and 4 show the hydrostat of FIGS. 1A, 1B and 1C in perspective. This makes it clear that attachment point post 6 is actually a post with a hole down into it in the preferred embodiment, and that guide post 12 is actually a pair of such guide posts 12. A pair of prongs 13 and 15 hold the beam 4 to post 6. Prong 13 (see FIGS. 1B and 1C) extends into the hole in post 6 and prong 15 cooperates with prong 13 in the manner of an old-fashioned all-wood clothes pin to grip the post and hold the arm in place.

A sliding element 16 serves as part of the trigger mechanism, and is stressed to move in the direction of the arrow in its surface, if free to do so. End 14 of beam 4 fits into a detent 18 in the sliding element 16, preventing it from sliding. When no pressure is applied, the sliding element is locked in place by the presence of end 14 in its detent 18. When the beam is raised high enough above the surface of the wafer for end 14 to clear detent 18 in sliding element 16, end 14 comes out of detent 18, and sliding element 16 is released to move in the direction in which it is stressed to go. In actual ordnance devices, several releases may have to take place sequentially, indicating satisfaction of several conditions, before such release takes place.

It is now apparent that a particular function of guide posts 12 is to prevent pressure from sliding element 16 from pushing the beam off-center.

In order to construct a hydrostat in accordance with the assembled-lever concept, it is necessary to create posts 6 and 12 and diaphragm 8 on one wafer, and to create the beam separately, usually on another wafer, then detach the beam from its wafer and assemble it into place. The microfabrication techniques described above can be used to manufacture a beam on a wafer, then detach it. With watchmaker precision, it is then press-fit or interference-fit into place into post 6, and with a much looser fit between posts 12. The hydrostat allows the beam or lever to deflect upwards by providing a deformable leaf hinge on the beam 4 and between foot 10 and posts 6A and 6B.

Referring now to FIG. 5, the entire structure can alternately be constructed on one wafer. Since there has not yet been any mass production, we can only guess, but we believe that the system of FIG. 5 might be more easily adapted to mass production.

In FIG. 5, the hydrostat is constructed according to the partially released concept. The backside of the wafer contains a diaphragm 8 which was wet-etched prior to the microfabrication process described above. According to this concept, the beam or lever 4 is fully released, and is connected by a fully released torsion bar or torsional spring 30 to non-released anchor posts 32 and 34. The guide posts 12A and 12B are also non-released portions. The parts of the partially released hydrostat are released in a timed process such that large parts remain anchored to the wafer while small parts are fully released. Whether or not a part is released depends upon whether the release solution, which begins from the edges and eats inward, has had time to act on the sacrificial metal which is under it. Narrow portions such as the beam and torsion bar are released with less time of exposure to the release solution than are wider parts such as the anchor posts and guide posts. This hydrostat allows the beam or lever to deflect upwards by providing a deformable torsional spring hinge 30 at the aft end of the lever.

Figure 2A:
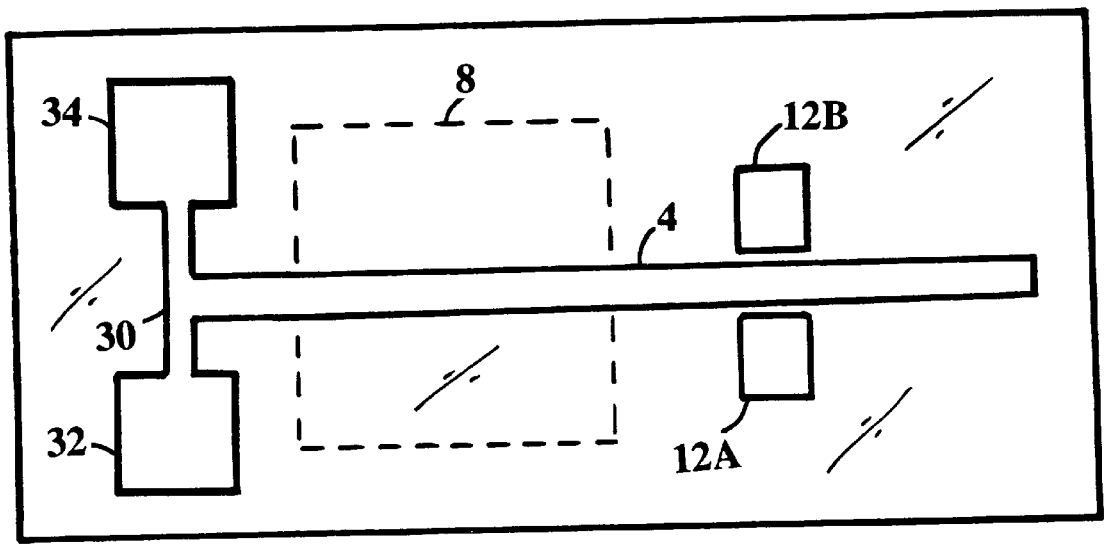
FIGS. 2A, 2B, and 2C are similar to FIGS. 1A, 1B, and 1C, except that the attachment is fixed, not pivoted, and elastic torsional springs attached to the beam allow the beam to pivot.
Figure 2B:
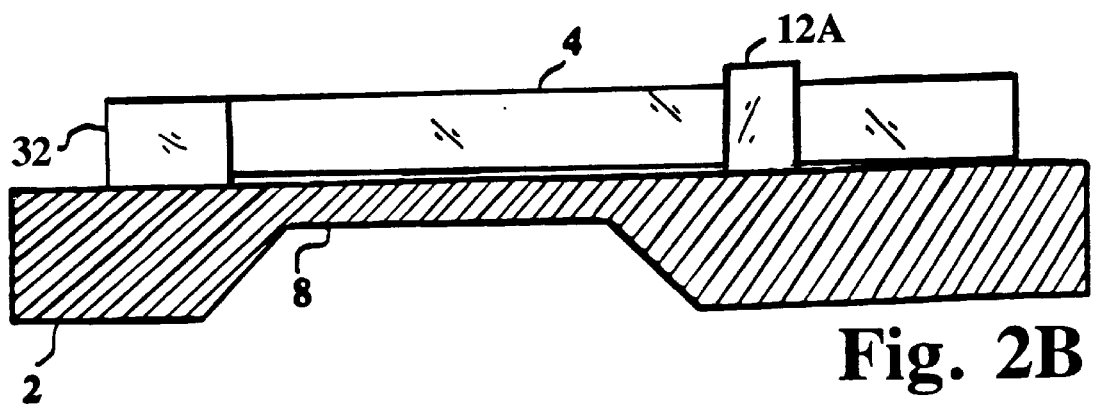
Figure 2C:
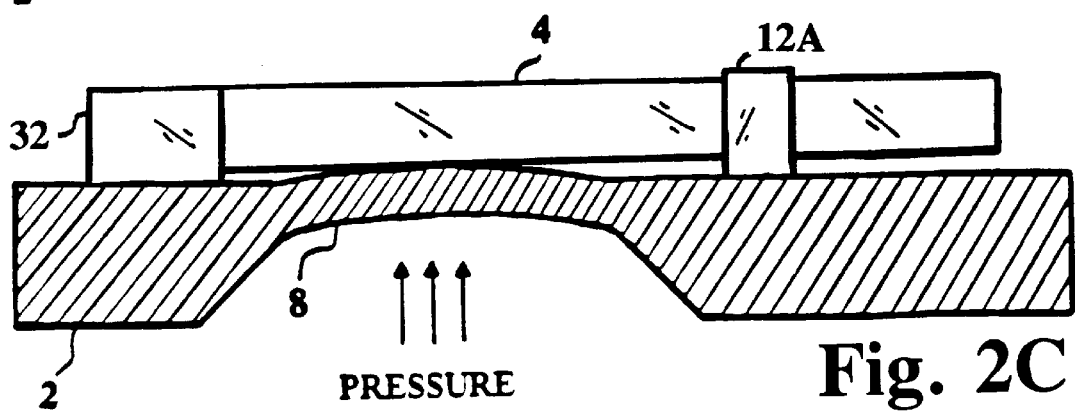

FIGS. 2A, 2B and 2C show similar views for the partially released embodiment to those shown in FIGS. 1A, 1B and 1C for the assembled lever concept. The parts correspond to those shown for FIG. 5. The torsional bar 30 rotates about its axis as pressure is applied, allowing movement of the lever as illustrated in FIGS. 2B and 2C.

While it is not absolutely essential that the wafer to be used be made of silicon, the use of silicon as a diaphragm material is desirable because of the compatibility of the diaphragm fabrication with the microfabrication process to be used. Also, it is likely that the diaphragm will be in direct contact with the environment (seawater for our application). Because of the diverse applications, the silicon diaphragm will need to survive a wide range of underwater pressures. The properties of single crystal silicon will ensure the survivability of the diaphragm under these conditions. Another concern for underwater applications is the corrosion of the material in contact with the seawater resulting in failure of the component. Silicon has been shown to have good resistance to corrosion in seawater.

The lever or beam in the presently preferred embodiments is made of electroplated nickel or nickel alloy. The lever has been designed based on the limited material properties available for nickel fabricated using this process. In the future, materials with similar stiffness and higher yield strength might alternately be used.

Another interesting feature of this design is the use of a leaf hinge or torsional spring to provide out-of-plane motion of a microfabricated device component. The springs used in microfabricated designs in the past were suspension or folded springs. The leaf hinge is an assembled hydrostat torsional spring component. The ability to produce semi-released structures led to the development of the torsional spring. Chronologically, the no-assembly-required, semi-released torsional spring is an advancement over the leaf hinge concept.

These hydrostats are developed based upon existing fabrication processes. Alternative fabrication processes may be possible, although no other fabrication methods have yet been shown to enable the fabrication of this hydrostat. The main competing processes may fall into two broad categories: i) material forming processes where a permanent shape change is imparted on a starting blank of material, and ii) micromechanical machining involving direct material removal processes.

In the first category, stamping and punching are forming process that might be most applicable for producing intricate shapes from blank material having the thickness of hundreds of microns. One trade-off with these two processes is that they do not always provide the precision needed.

Micromechanical machining processes, the second competing process, may be placed into two categories. The first category is chip-making processes where the tool used to remove the material imparts a force on the surface of the material.

Examples of these process types include: micromilling, microdrilling, polishing, grinding, and diamond machining. The second category is a forceless process where material removal is achieved by chemical, electrical, and thermal processes. Examples of these process types include deep reactive ion etching or other focused ion beam processes, micro-electrical discharge machining, and laser ablation or other laser-based processes.

Even if these processes were compatible with the production of the diaphragm, the alignment and dimensional tolerances achievable with microfabrication processes described at the beginning of this specification exceed those achievable with stamped or electrical discharge machined produced parts. The possibility exists that as technology advances, other materials may be used for the diaphragm and the lever. However, integration of the fabrication processes, and the alignment and dimensional tolerances achieved with the current invention using bulk microfabrication described at the beginning of the specification has resulted in successful production of the hydrostat. Future production of this hydrostat will require similar fabrication process integration and fabrication tolerances independent of the materials and processes used.

What we claim as our invention is:

1. An improved ambient fluid pressure sensor for determining when a predetermined pressure surrounds the sensor, comprising
   a. a planar wafer, including a relatively thin section surrounded by a relatively thick section,
   b. a housing for the wafer, so arranged that an exposed side of the wafer is exposed to the ambient fluid and a protected side of the wafer is protected from exposure to the fluid, whereby the relatively thin section of the wafer is a diaphragm which is deflected by the pressure of the fluid,
   c. a beam extending just above the protected side of the wafer, having a first end of the beam attached to a portion of the relatively thick section of the wafer, a second opposite end of the beam being free to rotate up and down relative to the surface of the wafer about a point near the first end, and an intermediate beam point mechanically arranged so that, when fluid pressure deflects the diaphragm, the diaphragm causes a movement of the intermediate point, thereby causing an even greater movement of the second end of the beam, and
   d. a trigger located adjacent to the second end of the beam, whereby, when the second end of the beam is moved by a predetermined amount, the trigger is mechanically actuated.

2. An improved hydrostat for determining when ambient water of a predetermined pressure surrounds the hydrostat, comprising
   a. a planar silicon wafer, including a relatively thin section surrounded by a relatively thick section,
   b. a housing for the wafer in the hydrostat, so arranged that a wet side of the wafer is exposed to the ambient water and a dry side of the wafer is protected from exposure to the water, whereby the relatively thin section of the wafer is a diaphragm whose deflection varies with the pressure of the ambient water,
   c. an attachment device fixedly attached to a point on the relatively thick section of the dry side of the wafer,
   d. a beam extending approximately parallel to the plane of the relatively thick section of the dry surface of the wafer, having a first end of the beam fixedly attached to the attachment device, a second opposite end of the beam being free to move up and down relative to the surface of the wafer about a point near the first end, and a point on the beam which is intermediate to the two ends being mechanically arranged so that, when the diaphragm is deflected by increasing pressures of water, the movement of the diaphragm causes a movement of the intermediate point, thereby causing an even greater movement of the second end of the beam, and
   e. a trigger located adjacent to the second end of the beam, whereby, when the second end of the beam is moved by a predetermined amount indicating a predetermined pressure surrounding the hydrostat, the trigger is mechanically actuated.

3. A hydrostat according to claim 2, wherein the attachment device comprises two post sections fixedly attached to the dry side of the wafer and situated a distance apart from each other, and the post further comprises a torsion bar having two ends, one end of the torsion bar being fixedly attached to one of the post sections and the other end of the torsion bar being fixedly attached to the other of the post sections, the torsion bar being otherwise free from attachment to the wafer, and the beam being fixedly attached to a midpoint on the torsion bar, and being otherwise free from attachment to the wafer, so that, as pressure on the diaphragm causes the diaphragm to push against the beam, the torsion bar twists, allowing the second end of the beam to move with respect to the wafer.

4. A hydrostat according to claim 2, wherein the attachment device comprises a post fixedly attached to the dry side of the wafer, a mechanical grip connecting the post firmly to the beam, and the beam including a thin springably deformable section near the post, which is otherwise free from attachment to the wafer, so that, as pressure on the diaphragm causes the diaphragm to push against the beam, the deformable section bends, allowing the second end of the beam to move with respect to the wafer.

5. An improved purely mechanical hydrostat for enabling arming of an underwater explosive device only when a predetermined depth of water is reached by determining when ambient water of a predetermined pressure equivalent to that found at the predetermined depth surrounds the hydrostat, comprising a. a planar silicon wafer, including a relatively thin rectangular section having side dimensions ranging from 1 to 5 millimeters and having a thickness ranging from 10 to 40 microns surrounded by a relatively thick section which has a full thickness of at least 300 microns, the relatively thin section having been obtained by chemically etching material from a section of one side of a full-thickness silicon wafer, b. a housing for the wafer in the hydrostat, so arranged that a wet side of the wafer is exposed to the ambient water and a dry side of the wafer is protected from exposure to the water, the wet side of the wafer being the side from which material was etched to produce the relatively thin section, whereby the relatively thin section of the wafer is a diaphragm whose deflection varies with the pressure of the ambient water, c. a post fixedly attached to a point on the relatively thick section of the dry side of the wafer, d. a beam made from a metal comprising predominantly nickel and having a length of from 5 to 25 millimeters located just above the planar surface of the dry side of the wafer and extending approximately parallel to the plane of the wafer, having a first end of the beam rotatably attached to the post, a second opposite end of the beam being free to rotate up and down relative to the surface of the wafer about the hinge portion, and a point on the beam which is intermediate to the two ends being mechanically arranged so that, when the diaphragm is deflected by increasing pressures of water, the movement of the diaphragm causes a movement of the intermediate point, thereby causing a movement of the second end of the beam approximately 3 to 9 times the movement of the diaphragm, and e. a trigger located adjacent to the second end of the beam and arranged so that its movement is blocked by the presence of the second end of the beam at very low ambient pressure, whereby, when the second end of the beam is moved by a predetermined amount indicating that the pressure has risen to a predetermined level surrounding the hydrostat and thus that the hydrostat is in a corresponding predetermined depth of water, the trigger is mechanically actuated, thereby enabling arming the underwater explosive device.

6. A device according to claim 5 wherein the rotatable attachment of the first end of the beam to the post is accomplished by a thin deformable hinge portion formed in the beam near the first end.

7. A device according to claim 5 wherein the rotatable attachment of the first end of the beam to the post is accomplished by attaching a torsion bar between two parts of the post and attaching the beam to the torsion bar.

* * * * *